(12) United States Patent
Reid et al.

(10) Patent No.: US 8,821,074 B2
(45) Date of Patent: Sep. 2, 2014

(54) LOAD BEARING CONSTRUCTION PILE

(76) Inventors: Stephen James Reid, Eye (GB);
Nicholas James Wincott, Ivybridge (GB)

(*) Notice: Subject to any disclaimer, the term of this patent is extended or adjusted under 35 U.S.C. 154(b) by 0 days.

(21) Appl. No.: 13/581,231

(22) PCT Filed: Feb. 25, 2011

(86) PCT No.: PCT/GB2011/050374
§ 371 (c)(1),
(2), (4) Date: Sep. 19, 2012

(87) PCT Pub. No.: WO2011/104559
PCT Pub. Date: Sep. 1, 2011

(65) Prior Publication Data
US 2013/0004244 A1  Jan. 3, 2013

(51) Int. Cl.
*E02D 5/54* (2006.01)
(52) U.S. Cl.
USPC .......................................... 405/244; 405/231
(58) Field of Classification Search
USPC ............... 405/130, 231, 232, 234, 236, 252.1
See application file for complete search history.

(56) References Cited

U.S. PATENT DOCUMENTS

| | | | |
|---|---|---|---|
| 5,339,890 A | | 8/1994 | Rawlings |
| 8,262,322 B2* | | 9/2012 | Desmeules ............ 405/231 |
| 2003/0221870 A1* | | 12/2003 | Johnson, Jr. ............ 175/71 |
| 2009/0110489 A1* | | 4/2009 | Armstrong ............ 405/267 |
| 2009/0250200 A1* | | 10/2009 | Kidwell et al. .......... 165/154 |
| 2010/0040419 A1* | | 2/2010 | Roussy ............... 405/244 |

FOREIGN PATENT DOCUMENTS

| | | |
|---|---|---|
| CA | 2691363 | 1/2009 |
| CN | 1800510 | 7/2006 |
| DE | 3719523 | 1/1988 |
| EP | 0189733 | 8/1986 |
| EP | 0582118 | 2/1994 |
| EP | 1243875 | 9/2002 |
| GB | 2442803 | 4/2008 |
| JP | 06173245 A * | 6/1994 |
| JP | 2001147056 | 3/2001 |
| JP | 2003035455 | 2/2003 |
| JP | 2006010098 | 1/2006 |
| WO | WO 80/02736 | 12/1980 |

* cited by examiner

*Primary Examiner* — Thomas B Will
*Assistant Examiner* — Katherine Chu
(74) *Attorney, Agent, or Firm* — D. Peter Hochberg; Sean F. Mellino; Richard A. Wolf

(57) ABSTRACT

A load bearing pile arrangement comprising a plurality of load bearing construction pile assemblies. Each comprises a pile provided with a support manifold at an upper end thereof. Each pile includes an outer tube and an inner tube between which, when the assembly is in use, provides a pathway for fluid pumped from above and down through the inner tube to a vortex manifold where the fluid swirls before passing upwards between the inner tube and the outer tube. The fluid also swirls as it passes upwards between the tubes and by at least one collar comprising an annular ring fixedly mounted on the tube the ring having helices, which cause the fluid to continue swirling as it passes upwards between the tubes and. In use, the load bearing pile arrangement can be used to recover heat from the surrounding ground; store heat in the surrounding ground; or, to store coolth, especially in a desert locality.

11 Claims, 7 Drawing Sheets

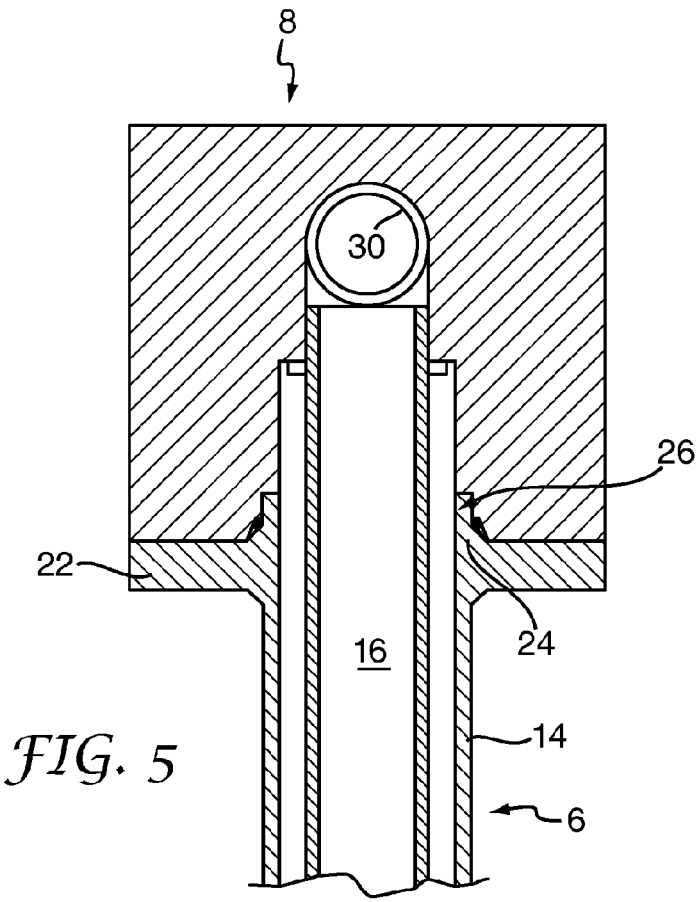
FIG. 5
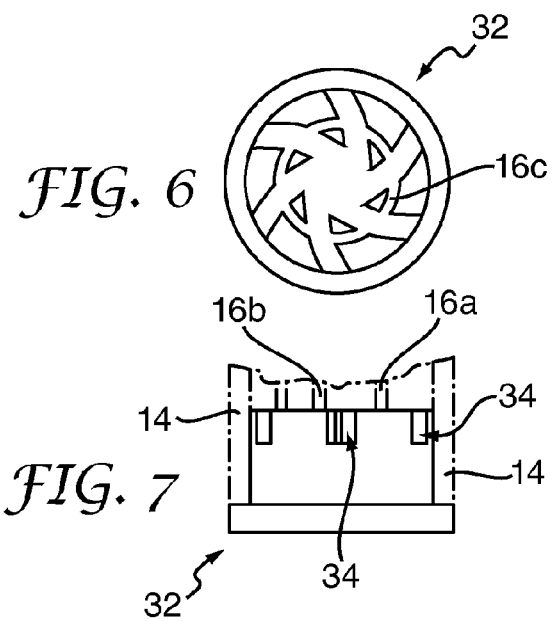
FIG. 6
FIG. 7
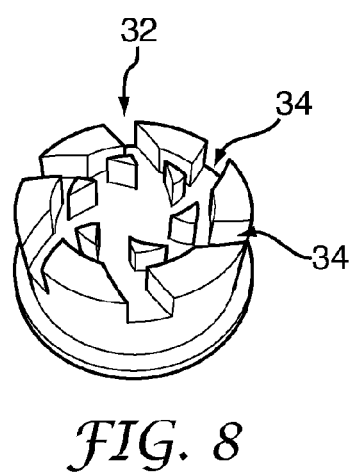
FIG. 8

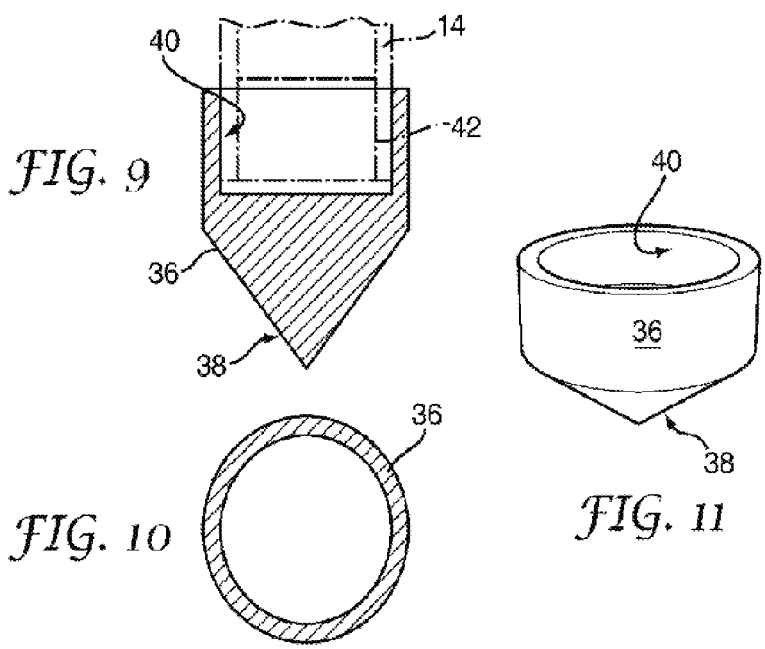
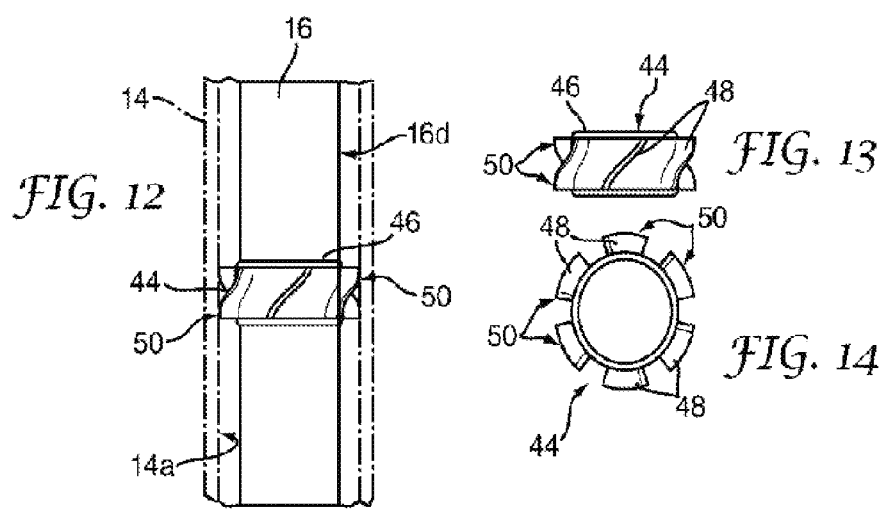

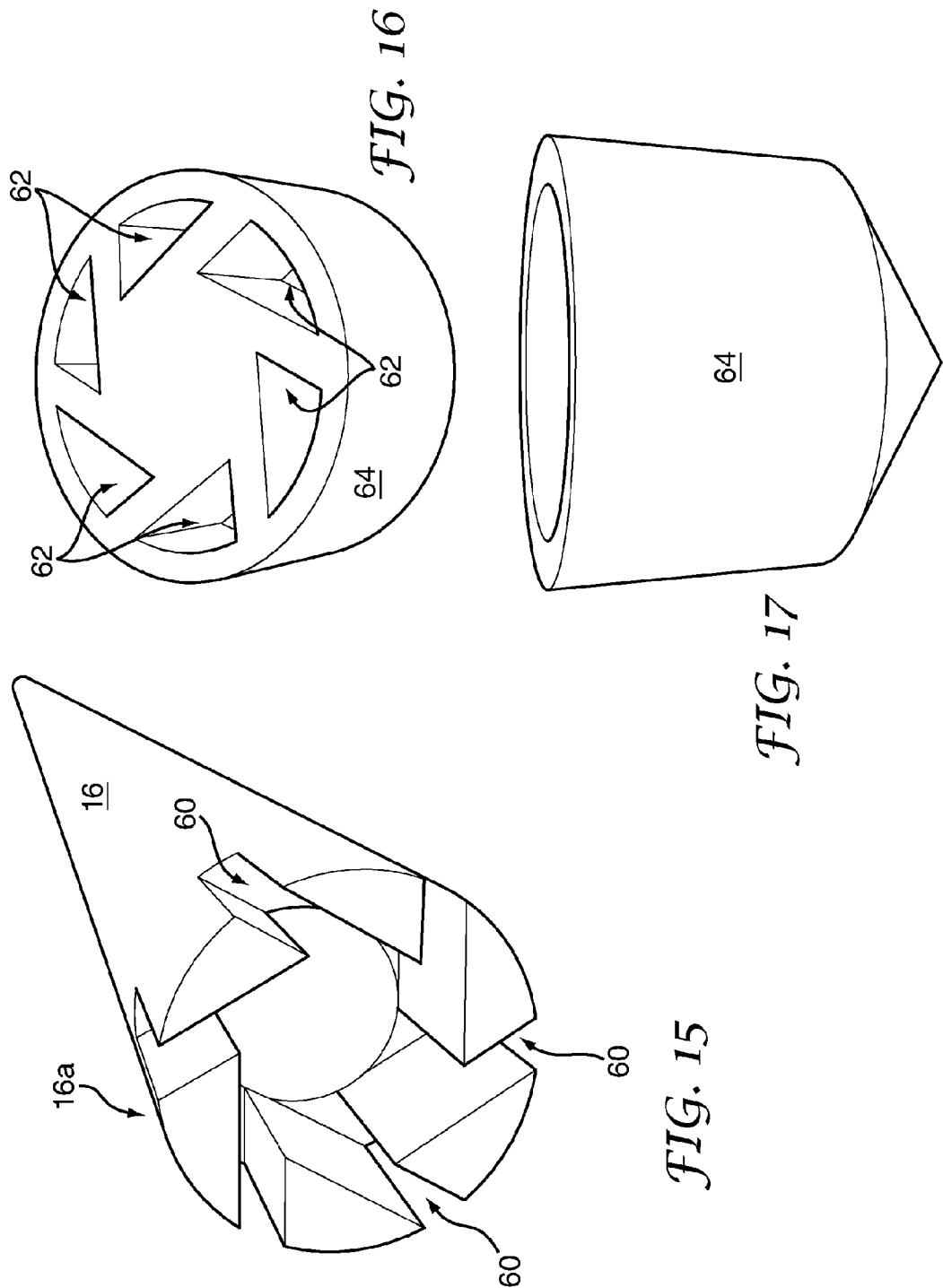

LOAD BEARING CONSTRUCTION PILE

CROSS-REFERENCE TO RELATED APPLICATIONS

This application is a National Stage application of International Application No. PCT/GB2011/050374, filed on Feb. 25, 2011, which claims priority of GB Application Serial Number 1003179.7, filed on Feb. 25, 2010, both of which are incorporated herein by reference in their entireties.

BACKGROUND OF THE INVENTION

1. Field of the Invention

This invention is concerned with improvement in or relating to a load bearing construction pile assembly and is particularly concerned with improvements in or relating to a load bearing construction pile arrangement comprised of a plurality of the load bearing construction pile assemblies.

2. Description of the Prior Art

Over the years there have been very many proposals for piles that are used as support structures for construction purposes. Such piles can be of substantial length depending upon the nature of the ground into which they are driven and the structures they have to support.

By the term 'structures' where used herein, it is meant any form of dwellings, offices or the like and any ground beam or similar structure for supporting dwellings, offices or the like.

It is also well known that piles may be utilised for the recovery of 'Deep Geothermal' heat; however, with the emphasis for new build being directed towards more energy efficient structures, for example housing and like structures, it is a requirement that all available energy resources are utilised, i.e. 'Ground Source' heat.

Therefore, the load bearing construction pile assemblies and arrangement of the present invention are intended for the recovery and or storage of heat in the upper level of the ground, i.e. within 5 to 10 meters of the surface and more particularly within 6 meters of the surface.

The load bearing construction pile assemblies and arrangement may also be used for 'heat rejection' when it is desired to lower the temperature of a structure. In addition, the assemblies and arrangement may be utilised to capture and store 'coolth', for example, in a desert situation where the cold night temperature is used to reduce the ground temperature whereby the 'coolth' may be recovered to reduce the daytime high temperatures of structures.

SUMMARY OF THE PRESENT INVENTION

In order to meet the above requirements of providing structural support and access for heat storage and recovery, the present invention conveniently provides a load bearing construction pile assembly comprising a pile, a support manifold located at an upper end of the pile, the manifold being arranged, in use, to provide support for a structure as hereinbefore defined.

The pile may be a driven pile which is driven into the ground by translational force from a pile driver. Alternatively the pile may be a screw pile which is driven into the ground by a turning force, optionally with translational force. For convenience hereinafter the invention will be described with reference to a screw pile; however it will be understood that the invention is not limited to this embodiment.

Preferably, the support manifold is provided with an upper surface that is suitable for ensuring the lateral stability of a structure supported thereon.

Conveniently, the screw pile comprises an outer tube and an inner tube, the outer tube being connected to a first port of the support manifold and the inner tube being connected to a second port of the support manifold.

In one preferred embodiment, provided by the present invention, the screw pile houses a vortex manifold located at a lower end portion thereof, which vortex manifold comprises location for a lower end portion of the inner tube, which is provided with openings in a peripheral wall for connection with radial channels provided in the vortex manifold.

Preferably, the screw pile comprises at least one collar located between the outer tube and the inner tube, each of which at least one collar comprises an annular ring for location on an outer wall of the inner tube, each of which at least one collar also comprising a series of spiral helices extending outwardly from the annular ring towards an inner wall surface of the outer tube.

In a preferred embodiment of the invention, the outer tube comprises an upper end flange by which upper end flange it is secured to the support manifold, the outer tube comprises a cap at its lower end portion and the outer tube and the lower end cap are made of steel with an end portion of the tube being threaded for engagement in a screw threaded bore of the end cap.

Conveniently, the support manifold is moulded from a plastic composition to withstand a safe working load in excess of 225 kN.

Preferably, the plastic composition for the support manifold is cast nylon or a carbon fibre reinforced polymer composite.

Conveniently, the present invention provides a load bearing construction pile arrangement comprising a plurality of load bearing construction pile assemblies according to the last nine preceding paragraphs.

Preferably, the upper surfaces of the support manifolds are arranged in mutual alignment, or substantially so, for supporting a structure as hereinbefore defined.

The present invention also conveniently provides a construction pile assembly comprising an outer tube, an inner tube and a vortex manifold located at a lower end portion thereof, which manifold comprises location for a lower end portion of the inner tube, which is provided with openings in a peripheral wall thereof for connection with radial channels provided in the vortex manifold.

Preferably, the construction pile assembly comprises at least one collar located between the outer tube and the inner tube, each of the at least one collar comprises an inner ring for location on an outer wall of the inner tube, each of which at least one collar also comprising a series of spiral helices extending outwardly from the annular ring towards an inner wall surface of the outer tube.

Conveniently, the outer tube comprises an upper end flange for attachment, in use, to a structure as herein defined, the outer tube also comprising an end cap at its lower end portion and, preferably, the outer tube and the end cap are made of steel with an end portion of the outer tube being threaded for engagement in a screw threaded bore of the end cap.

In a preferred construction pile assembly, the outer tube is provided with a series of helical vanes on an outer wall thereof for facilitating the installation of the construction pile in the ground when in use.

The present invention also provides a method for ground heat recovery using the load bearing construction pile arrangement of the last two preceding paragraphs, the method including the pumping of a thermal transfer fluid as herein defined at a low temperature down through the inner tubes of the screw piles to pass through the vortex manifolds where the fluid is caused to swirl in a spiral path and upwards between the inner and outer tubes of the screw piles, the fluid being caused to swirl up between the inner and outer tubes as it passes through the spiral helices of the at least one collar located between the inner and out tubes with the fluid being subjected to heat transfer from the surrounding ground, the fluid, at a higher temperature, then passing through the first ports of the support manifold and to a heat exchanger, a heat pump or other storage facility for recycling.

In a further development of the present invention there is provided a method for ground heat storage using the load bearing construction pile arrangement disclosed herein, the method including the pumping of a thermal exchange fluid as herein defined at a high temperature from down through the outer tubes of the screw piles to pass through the spiral helices of the at least one collar located between the inner and outer tubes with the temperature of the fluid being lowered as it gives off its heat to the surrounding ground through the walls of the outer tubes, the fluid thereafter passing through the vortex manifolds and upwards through the inner tubes of the load bearing construction pile arrangement to pass through the second ports of the support manifolds to a heat exchanger, a heat pump or other storage facility for recycling.

BRIEF DESCRIPTION OF THE DRAWINGS

There now follows by way of example of the invention a detailed description that is to be read with reference to the accompanying drawings in FIG. 1 is a diagrammatic perspective view of one aspect of the invention;

FIG. 5 is a section view as seen along the line V-V of FIG. 3;

FIG. 6 is a plan view of a vortex manifold of the present invention;

FIG. 7 is a side view of the vortex manifold shown in FIG. 6;

FIG. 8 is a diagrammatic perspective view of the vortex manifold shown in FIGS. 6 and 7;

FIG. 9 is section view of a cap element of the present invention;

FIG. 10 is a plan view of the element shown in FIG. 9;

FIG. 11 is a diagrammatic perspective view of the cap shown in FIGS. 9 and 10;

FIG. 12 is a side elevation, partly in section, of an outer tube and an inner tube and a collar located therebetween;

FIG. 13 is a side view of the collar shown in FIG. 12;

FIG. 14 is a plan view of the collar shown in FIG. 13;

FIGS. 15 to 17 illustrate a first modified arrangement for the vortex manifold of FIG. 6.

DETAILED DESCRIPTION

Figure 1:
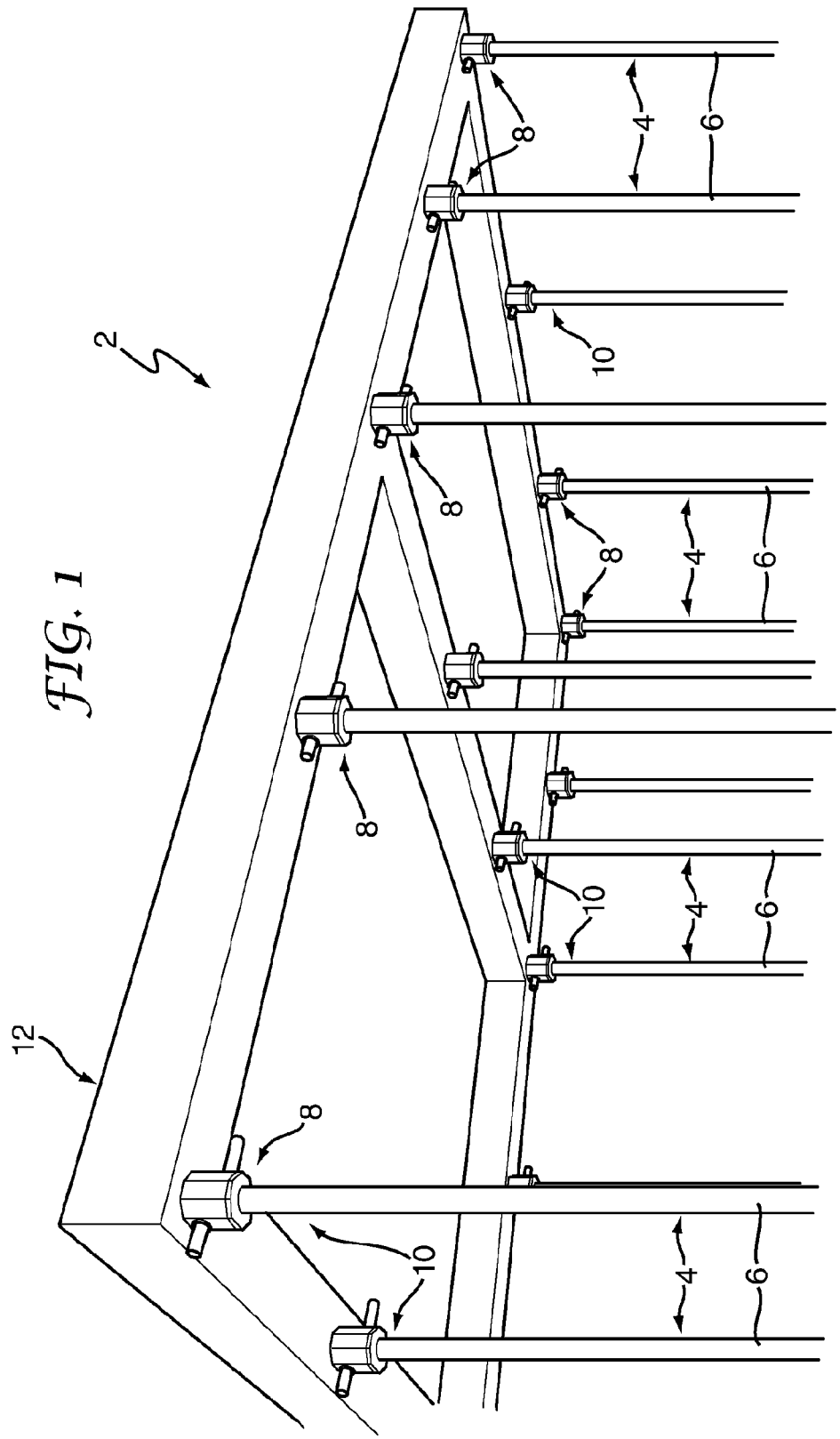

Generally, a load bearing, construction pile, arrangement 2 of the present invention comprises a plurality of load bearing, construction pile assemblies 4, see FIG. 1.

Figure 2:
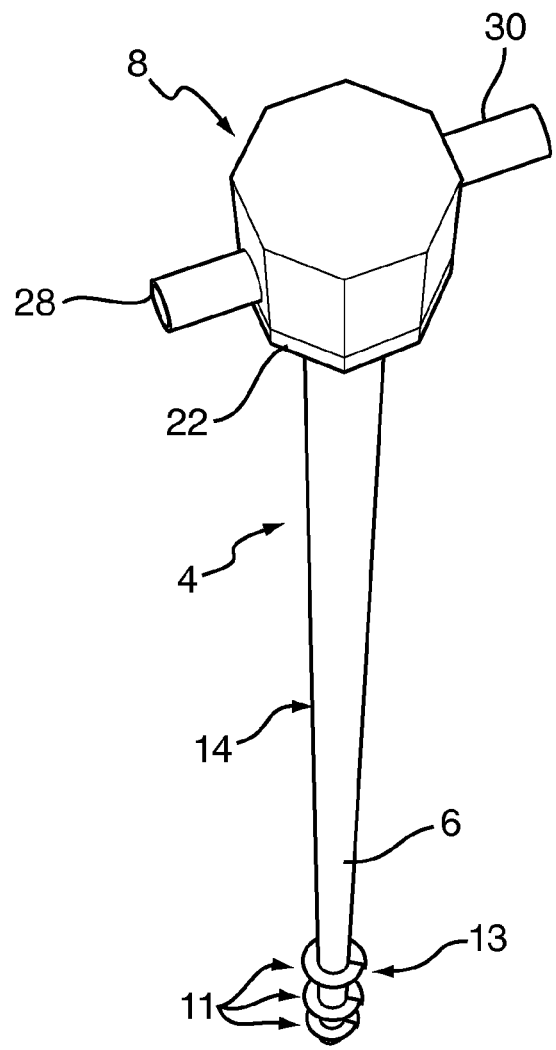
FIG. 2 is a diagrammatic perspective view of one of the elements shown in FIG. 1.

In this embodiment, each of the load bearing, construction pile assemblies 4 generally comprises a screw pile 6, a support manifold 8 located at an upper end 10 of the screw pile 6 to provide support for a structure such as a ground beam 12, see FIG. 1, the screw pile 6 also comprising three conventional part helices 11 towards a lower end 13 of the screw pile 6, see FIG. 2.

Figure 4:
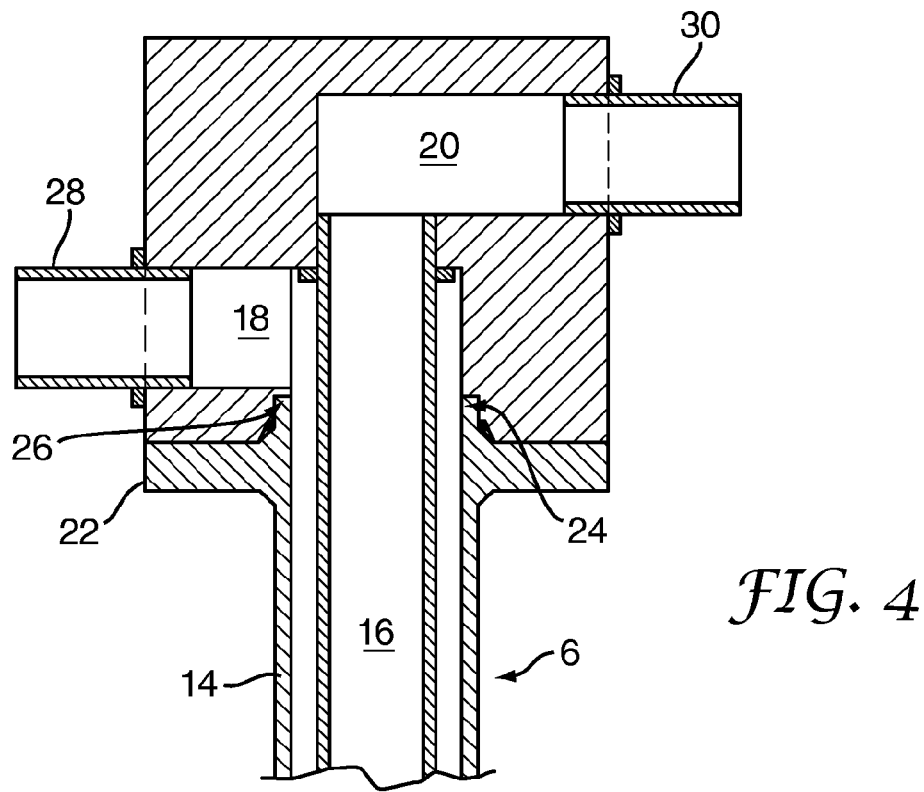
FIG. 4 is a section view as seen along the line IV-IV of FIG. 3.
Figure 18:
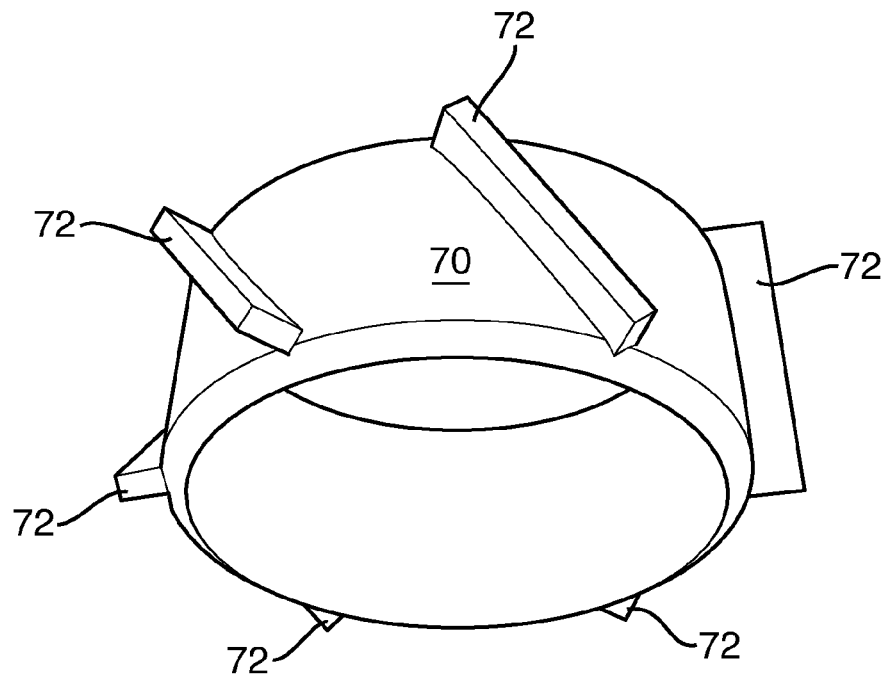
FIGS. 18 and 19 illustrate a second modified arrangement for the vortex arrangement of FIG. 6.
Figure 19:
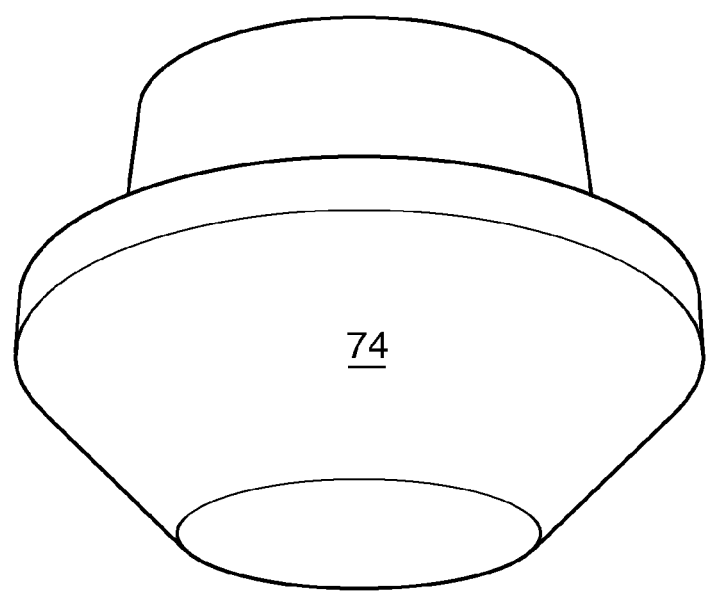

Specifically, each screw pile 6 comprises an outer tube 14 and an inner tube 16 with the outer tube 14 and inner tube 16 being connected to a first port 18 and a second port 20 respectively of the support manifold 8, see FIGS. 4 and 5.

At its upper end 10, the screw pile 6 is connected to the support manifold 8 by an octagonal flange 22 with a spigot 24 thereof being received in a bore 26 of the support manifold 8, see FIGS. 4 and 5. The octagonal flange 22 may be secured to the support manifold 8 by an adhesive composition or another means such as bolts, not shown.

Figure 3:
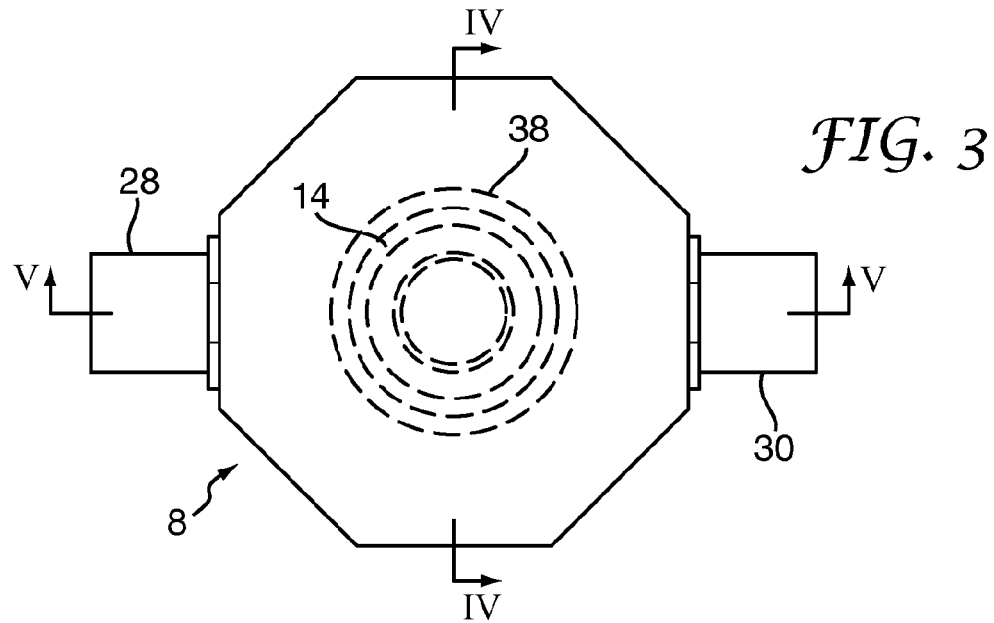
FIG. 3 is a plan view of an upper element of FIG. 2.

The first port 18 of the support manifold 8 is provided with an inlet/outlet pipe 28 for a purpose to be described hereinafter. Likewise, the second port 20 of the support manifold 8 is provided with an inlet/outlet pipe 30 for a purpose to be described hereinafter, see FIGS. 3, 4 and 5.

At its lower end 13, the screw pile 6 houses a vortex manifold 32, which provides support for a lower end portion 16a of the inner tube 16, which lower end portion 16a is provided with openings 16b in a peripheral wall 16c of the inner tube 16, see FIG. 7, wherein the lower end portion 16a, the openings 16b and the peripheral wall 16c are only shown in chain dotted lines.

The openings 16b of the tube 16 are arranged in line with vortex channels 34 of the vortex manifold 32 for a purpose to be described hereinafter, see FIG. 7.

The outer tube 14 of the screw pile 6 is closed at the lower end 36 by a pointed cap 38 that provides seating for the vortex manifold 32, the pointed cap 38 comprising a threshold bore 40 for receiving a threaded lower end 42 of the outer tube 14, see FIGS. 7, 9, 10 and 11.

The screw pile 6 is also provided with a collar 44 located between the outer tube 14 and the inner tube 16, see FIG. 12. The collar 44, of which there may be several, comprises an annular ring 46 for location on an outer wall 16a of the inner tube 16, see FIGS. 12, 13 and 14.

The ring 46 of the collar 44 has a six helices 48 that radiate outwardly from the ring 46 with outer radial ends 50 thereof being located adjacent an inner wall surface 14a of the outer tube 14, see FIG. 12 in which the outer tube 14 is shown in chain dotted line.

In a method for ground heat recovery using the load bearing construction pile arrangement 2, a thermal transfer fluid as herein defined at a low temperature is pumped down through the inner tubes 16 of the screw piles 6 to pass through the vortex manifolds 32 where the fluid is caused to swirl in a spiral path and upwards between the outer tube 14 and the inner tubes 16 of the screw piles 6, the fluid being caused to swirl upwardly as it passes through the spiral helices 48 of the collars 44 located between the inner tubes 16 and outer tubes 14 with the fluid being subjected to heat transfer from the surrounding ground, the fluid, at a higher temperature, then passing through the first ports 18 of the support manifolds 8 and to a heat exchanger, a heat pump or other storage facility, not shown, for recycling.

In a further development of the present invention there is provided a method for ground heat storage using the load bearing construction pile arrangement 2 disclosed herein, the method including the pumping of a thermal transfer fluid as herein defined at a high temperature from down through the outer tubes 14 of the screw piles 6 to pass through the spiral helices 48 of the collars 44 located between the inner tubes 16 and the outer tubes 14 with the temperature of the fluid being lowered as it gives off Its heat to the surrounding ground through walls 14b of the outer tubes 14, the fluid thereafter passing through the vortex manifolds 32 and upwards through the inner tubes 16 of the load bearing construction pile arrangement 2 to pass through the second ports 20 of the support manifolds 8 to a heat exchanger, a heat pump or other storage facility, not shown, for recycling.

Similar methodology may be used for 'heat rejection' or the capture of 'coolth' as described hereinbefore.

The screw piles of the present invention are approximately 6 m in length and are designed to withstand a safe working load of in excess of 225 kN.

To this end, the outer tube 14, its flange 22 and the end cap 38 are made from steel.

The screw piles may be longer than 6 m in length to suit requirements of the construction they are to support and the nature of the subsoil into which they are driven. Thus screw piles of 12 m or more may be provided by the present invention.

The support manifolds 8 are made from cast nylon or a carbon reinforced polymer composite; however, any suitable polymer composition may be utilised commensurate with providing the required operational strength to the support manifolds 8 of the load bearing construction pile arrangement 2.

The inner tubes 16 of the screw piles 6 may be made from steel although they may also be made from a polymer composite of the required strength and durability for extended usage over the life of the structure supported by the construction pile arrangement 2.

It is envisaged that the present invention may include any heat source located in the structure that is supported by the load bearing construction pile arrangement 2, for example the structure may include a heat exchanger, a heat pump, solar panels or any other resource that may be utilised by the invention for heat recovery and/or heat storage.

The present invention also provides a construction pile assembly comprising the outer tube 14, the inner tube 16, the flange 22, the vortex manifold 32, the collars 44 and the end cap 38. In a modified construction pile assembly the outer tube 14 may be provided with a series of helical vanes on an outer wall thereof to aid the installation of the construction pile assembly in the ground when in use.

In the first modified arrangement for the vortex manifold 32, the lower end 16a of the inner tube 16 is provided with six equally spaced radial slots 60, which, in use, are adapted to be received in six radial recesses 62 provided in a lower end cap 64, see FIGS. 15 to 17.

When the lower end cap 64 is attached to the lower end 16a of the inner tube 16, because the radial slots 60 are longer than the recesses 62, pathways are provided for fluid to swirl in a spiral path and upwards between the inner and outer tubes 16 and 14 respectively of the screw piles.

In the second modified arrangement for the vortex manifold 32, a collar 70, adapted to be received between the lower end 16a of the inner tube 16a and a lower end cap 74, is provided with six equally spaced spiral walls 72 on an outer wall surface of the collar 70, whereby, when the second modified arrangement is in use, pathways are provided for fluid to swirl in a radial path and upwards between the inner and outer tubes 16 and 14 respectively of the screw piles.

Where used herein, the term 'thermal transfer fluid' may be water, a water/antifreeze mixture of either ethanol and/or glycol, or a gas, e.g. carbon dioxide.

Other modifications may be made within the scope of the present invention.

The articles 'a' and 'an' are used herein to denote 'at least one' unless the context requires otherwise.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A load bearing construction pile assembly comprising a pile, a support manifold located at an upper end of the pile, the manifold being arranged, in use, to provide support for a structure as hereinbefore defined, wherein the pile comprises an outer tube and an inner tube and a vortex manifold located at a lower end portion of the pile, wherein said vortex manifold comprises a location for lower end portions of the outer and inner tubes, and wherein, in use, fluid is passed downwardly through the inner tube and upwardly through an annular passageway defined between the inner and outer tubes, wherein the vortex manifold induces swirling of the fluid so that the fluid enters the annular passageway as a spiral flow;

wherein the outer tube comprises an upper end flange for securing the outer tube to the support manifold and the outer tube comprises a cap at the lower end; and wherein the inner tube further comprises openings and a peripheral wall, said openings provided in said peripheral wall for connecting with radial channels provided in the vortex manifold.

2. A load bearing construction pile assembly according to claim 1, wherein the support manifold comprises a first port and second port, and wherein said outer tube is connected to said first port of the support manifold and the inner tube is connected to said second port of the support manifold.

3. A load bearing construction pile assembly according claim 1, wherein the pile comprises at least one collar located in the annular passageway between the outer and inner tubes, wherein each of said at least one collar comprises an annular ring for location on an outer wall of the inner tube, and wherein each of said at least one collar also comprises a series of spiral helices extending outwardly from the annular ring towards an inner wall surface of the outer tube.

4. A load bearing construction pile assembly according to claim 1, wherein the outer tube and the lower end cap are made of steel with an end portion of the outer tube being threaded for engagement in a screw threaded bore of the end cap.

5. A load bearing construction pile assembly according to claim 1, wherein said support manifold is moulded from a plastic composition to withstand a safe working load of 225 kN.

6. A load bearing construction pile assembly according to claim 5, wherein the plastic composition for the support manifold is a material selected from the group consisting of cast nylon and a carbon fibre reinforced polymer composite.

7. A load bearing construction pile arrangement comprising a plurality of load bearing construction pile assemblies according to claim 1.

8. A load bearing construction pile arrangement according to claim 7, wherein the upper surfaces of the support manifolds are arranged in mutual alignment, or substantially so, for supporting a structure as hereinbefore defined.

9. A load bearing construction pile assembly comprising a pile, a support manifold located at an upper end of the pile, the manifold being arranged, in use, to provide support for a structure as hereinbefore defined, wherein the pile comprises an outer tube and an inner tube and a vortex manifold located at a lower end portion of the pile, wherein said vortex manifold comprises a location for lower end portions of the outer and inner tubes, and wherein, in use, fluid is passed downwardly through the inner tube and upwardly through an annular passageway defined between the inner and outer tubes, wherein the vortex manifold induces swirling of the fluid so that the fluid enters the annular passageway as a spiral flow;

wherein the outer tube comprises an upper end flange for securing the outer tube to the support manifold and the outer tube comprises a cap at the lower end;

wherein the support manifold comprises a first port and second port, and wherein said outer tube is connected to said first port of the support manifold and the inner tube is connected to said second port of the support manifold; and wherein the vortex manifold comprises a plurality of radial slots bounded by radial walls formed in said lower end portion of the inner tube, wherein said radial walls are fixedly received in recesses provided in a lower end cap of the construction pile said cap at the lower end of said outer tube.

10. A load bearing construction pile assembly according to claim 9, wherein the radial walls and the radial slots are longer than the depth of the recesses so that pathways are provided for fluid, which, when the pile is in use, is induced to swirl upwards through the annular passageway between the inner and outer tubes of the construction pile.

11. A load bearing construction pile assembly according to claim 1, wherein the pile is a screw pile.

\* \* \* \* \*

UNITED STATES PATENT AND TRADEMARK OFFICE
CERTIFICATE OF CORRECTION

| | |
|---|---|
| PATENT NO. | : 8,821,074 B2 |
| APPLICATION NO. | : 13/581231 |
| DATED | : September 2, 2014 |
| INVENTOR(S) | : Stephen James Reid et al. |

It is certified that error appears in the above-identified patent and that said Letters Patent is hereby corrected as shown below:

On the Title Page

After the details of item "(65) Prior Publication Data," insert item (30) as noted below:

--(30) Foreign Application Priority Data

Feb. 25, 2010  (GB) ........ 1003179.7--

Signed and Sealed this
Twenty-fifth Day of November, 2014

Michelle K. Lee
*Deputy Director of the United States Patent and Trademark Office*